(12) United States Patent
Umetsu et al.

(10) Patent No.: US 11,534,764 B2
(45) Date of Patent: Dec. 27, 2022

(54) CARTRIDGE

(71) Applicant: Otsuka Pharmaceutical Co., Ltd., Tokyo (JP)

(72) Inventors: Hiroshi Umetsu, Kokubunji (JP); Masataka Matsuo, Hachioji (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 343 days.

(21) Appl. No.: 15/770,667

(22) PCT Filed: Nov. 7, 2016

(86) PCT No.: PCT/JP2016/082940
§ 371 (c)(1),
(2) Date: Apr. 24, 2018

(87) PCT Pub. No.: WO2017/082195
PCT Pub. Date: May 18, 2017

(65) Prior Publication Data
US 2018/0311668 A1 Nov. 1, 2018

(30) Foreign Application Priority Data

Nov. 13, 2015 (JP) .............................. JP2015-223368

(51) Int. Cl.
*B01L 3/00* (2006.01)
*G01N 35/02* (2006.01)
(Continued)

(52) U.S. Cl.
CPC ............ *B01L 3/50851* (2013.01); *B01L 3/00* (2013.01); *B01L 3/502* (2013.01); *B01L 3/527* (2013.01);
(Continued)

(58) Field of Classification Search
CPC ........... B01L 3/5085; B01L 2300/0829; B01L 2300/0851; B01L 3/50851; B01L 3/00;
(Continued)

(56) References Cited

U.S. PATENT DOCUMENTS 4,150,089 A * 4/1979 Linet ................ A61B 5/150351
422/550
7,972,516 B2 7/2011 Kreuwel et al.
(Continued)

FOREIGN PATENT DOCUMENTS

EP 1963853 A2 9/2008
EP 2618161 A1 7/2013
(Continued)

OTHER PUBLICATIONS

Office Action dated Apr. 24, 2019 from corresponding European Patent Application No. 16864156.1.
(Continued)

*Primary Examiner* — Neil N Turk
(74) *Attorney, Agent, or Firm* — Lucas & Mercanti, LLP

(57) ABSTRACT

[Problem] To ensure that a fluid is prevented from overflowing from a well and exposing the user to a biohazard. [Solution] A cartridge for use in measuring a component to be measured contained in a fluid includes a recessed well, formed for storing the fluid, the well including: a lower barrel portion that defines a lower space having a closed bottom; and an upper barrel portion that is formed above the lower barrel portion and defines an upper space having an opening on the top end, wherein a step portion is formed between the lower barrel portion and the upper barrel portion, the step portion being formed on an inner wall surface of the well and defining a step that continuously connects the inner wall surface of the lower barrel portion and the inner wall surface of the upper barrel portion.

17 Claims, 13 Drawing Sheets

(51) Int. Cl.
*G01N 35/00* (2006.01)
*G01N 35/04* (2006.01)

(52) U.S. Cl.
CPC ........... *G01N 35/02* (2013.01); *G01N 35/026*
(2013.01); *G01N 35/028* (2013.01); *B01L*
*2200/0605* (2013.01); *B01L 2300/028*
(2013.01); *B01L 2300/0858* (2013.01); *B01L*
*2300/0861* (2013.01); *G01N 2035/0401*
(2013.01); *G01N 2035/0412* (2013.01)

(58) Field of Classification Search
CPC .... B01L 3/502; B01L 3/527; B01L 2300/028;
B01L 2200/0605; B01L 2300/0858;
C12M 23/12; C12M 25/06; G01N 35/02;
G01N 35/026
See application file for complete search history.

(56) References Cited

U.S. PATENT DOCUMENTS

| | | | | |
|---|---|---|---|---|
| 2002/0057995 | A1* | 5/2002 | Desie | B01L 3/5025 |
| | | | | 422/400 |
| 2004/0187958 | A1* | 9/2004 | Viola | B01L 3/06 |
| | | | | 141/329 |
| 2006/0263875 | A1* | 11/2006 | Scott | B01L 3/50255 |
| | | | | 435/288.4 |
| 2008/0020455 | A1 | 1/2008 | Zantl et al. | |
| 2009/0298116 | A1* | 12/2009 | Fang | B81C 99/009 |
| | | | | 435/29 |
| 2011/0015091 | A1* | 1/2011 | Glezer | G01N 33/54393 |
| | | | | 506/9 |
| 2016/0103061 | A1* | 4/2016 | Weber | B01L 3/5082 |
| | | | | 356/246 |

FOREIGN PATENT DOCUMENTS

| | | |
|---|---|---|
| JP | H09-101302 A | 4/1997 |
| JP | 2009-150912 A | 7/2009 |
| JP | 2010-032487 A | 2/2010 |
| JP | 2011-128019 A | 6/2011 |
| WO | 2007076023 A2 | 7/2007 |

OTHER PUBLICATIONS

JPO, Office Action for the corresponding Japanese patent application No. 2017-550302, dated Jan. 28, 2020, with English translation.
International Search Report dated Jan. 31, 2017 from corresponding International Application No. PCT/JP2016/082940 and English translation.
Written Opinion of the International Searching Authority dated Jan. 31, 2017 from corresponding International Application No. PCT/JP2016/082940 and English translation.
Extended European Search Report dated Jul. 18, 2018 from corresponding European Application No. 16864156.1.
EPO, Office Action for the corresponding European patent application No. 16864156.1, dated Nov. 7, 2019 (5 pages).
EPO, Extended European Search Report for the corresponding European patent application No. 20177344.7, dated Jul. 3, 2020.

* cited by examiner

Fig. 13

|  | SHAPE OF DETECTION WELL | EVALUATION RESULT | REMARKS |
|---|---|---|---|
| EXAMPLE 1 | SHAPE 1 | ○ | |
| EXAMPLE 2 | SHAPE 2 | ○ | VISIBILITY IMPROVED BY COLORING |
| EXAMPLE 3 | SHAPE 3 | ○ | VISIBILITY IMPROVED BY COLORING |
| EXAMPLE 4 | SHAPE 4 | △ | |
| EXAMPLE 5 | SHAPE 5 | △ | |
| EXAMPLE 6 | SHAPE 6 | △ | |
| COMPARATIVE EXAMPLE 1 | SHAPE 7 | ✗ | MARKED LINE THIN AND HARDLY VISIBLE |

CARTRIDGE

CROSS REFERENCE TO RELATED APPLICATION

This Application is a 371 of PCT/JP2016/082940 filed on Nov. 7, 2016 which, in turn, claimed the priority of Japanese Patent Application No. JP 2015-223368 filed on Nov. 13, 2015, both applications are incorporated herein by reference.

TECHNOLOGICAL FIELD

The present invention relates to a cartridge used when a component to be measured contained in a fluid is measured.

BACKGROUND ART

Conventionally, for conducting an experiment using a test method or experimental method based on immunoreaction as a detection principle, such as the principles of surface-plasmon field-enhanced fluorescence spectroscopy (SPFS), cartridges structured to enable the amount of a sample to be checked so as not to dispense an incorrect amount even when there is no quantitating tool available at the experiment site are known (Patent Literature 1, for example). In such cartridge, scale marks are disposed on the inner wall surface of a well formed in the cartridge, so that the user can visually recognize the amount of an injected sample.

CITATION LIST

Patent Literature

Patent Literature 1: Japanese Unexamined Patent Application Publication No. 2009-150912

SUMMARY

Technical Problem

However, if the user cannot correctly make a visual identification of the scale marks on the aforementioned cartridge, a sample in an amount larger than required for measurement may be dispensed into a well by mistake to overflow from the well, thus exposing the user to a biohazard.

To prevent dispensing an incorrect amount of sample required for measurement, a possible solution may be forming highly visible scale marks on the inner wall surface of a well. In this case, however, undercuts have to be made on the scale marks during injection molding, which makes it difficult to produce wells. Furthermore, even when highly visible scale marks are formed on the inner wall surface of a well, an injected sample may adhere to the scale marks, with the result that a sample in an amount required for measurement cannot be taken.

An object of the present invention is to provide a cartridge that prevents a fluid from overflowing from a well and exposing the user to a biohazard and that ensures that a required amount of fluid can be taken.

Solution to Problem

To achieve at least one of the aforementioned objects, a cartridge according to the present invention is:

a cartridge for use in measuring a component to be measured contained in a fluid, the cartridge including a recessed well formed for storing the fluid, wherein the well includes:
a lower barrel portion that defines a lower space having a closed bottom; and
an upper barrel portion that is formed above the lower barrel portion and defines an upper space having an opening on a top end, and wherein a step portion is formed between the lower barrel portion and the upper barrel portion, the step portion being formed on an inner wall surface of the well and defining a step that continuously connects the inner wall surface of the lower barrel portion and the inner wall surface of the upper barrel portion.

Advantageous Effects of Invention

The cartridge according to the prevent invention can ensure that a fluid is prevented from overflowing from a well and exposing the user to a biohazard.

BRIEF DESCRIPTION OF THE DRAWING

FIG. 13 shows results of experiments conducted on examples according to the embodiments.

DETAILED DESCRIPTION OF EMBODIMENTS

Figure 1:
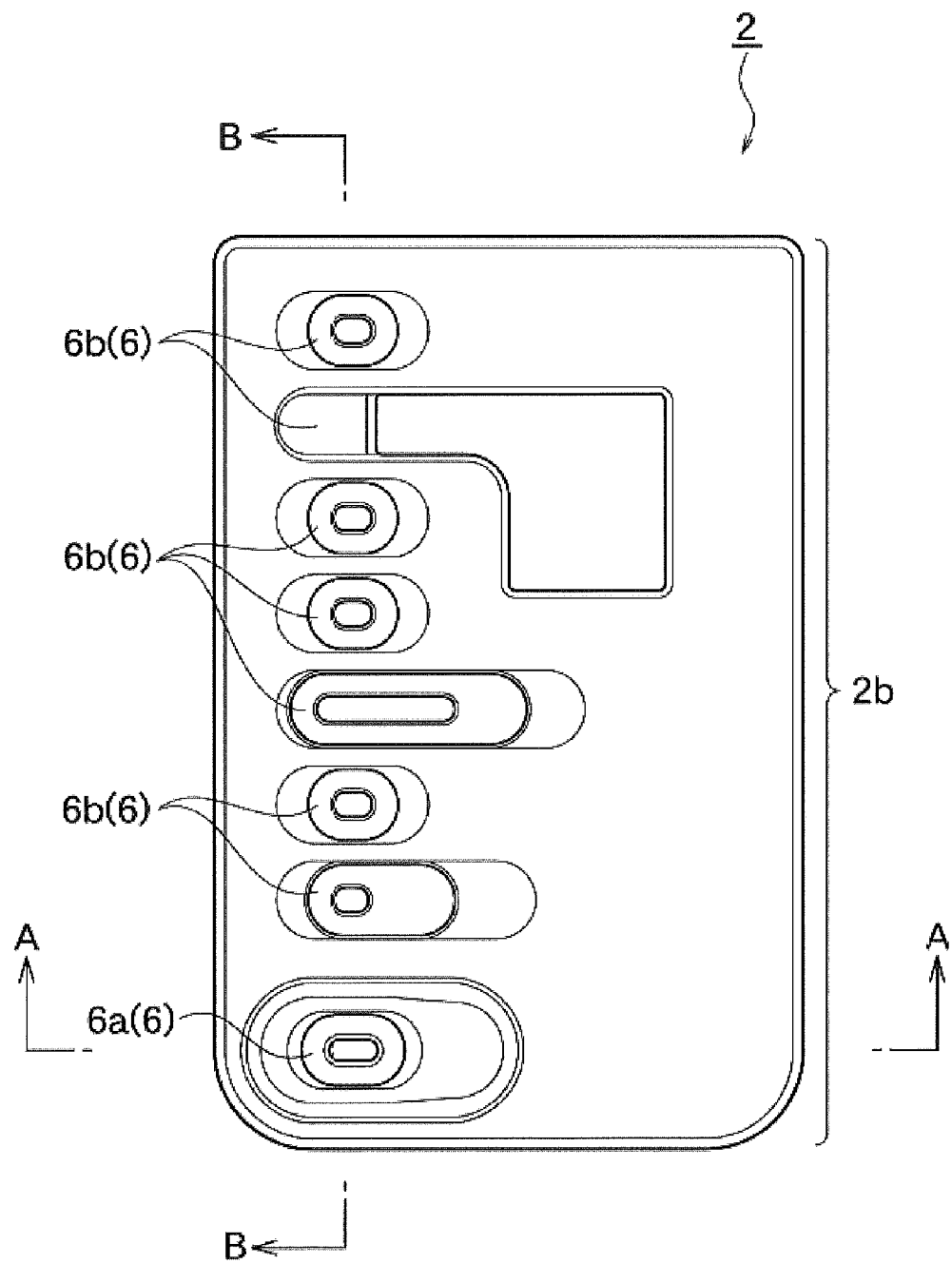
FIG. 1 is a plan view illustrating a surface of a cartridge according to an embodiment.

The cartridge of the present invention includes the following:

The cartridge of the present invention is:

a cartridge for use in measuring a component to be measured contained in a fluid, the cartridge including a recessed well formed for storing the fluid, wherein the well includes:
a lower barrel portion that defines a lower space having a closed bottom; and
an upper barrel portion that is formed above the lower barrel portion and defines an upper space having an opening on a top end, and
wherein a step portion is formed between the lower barrel portion and the upper barrel portion, the step portion being formed on an inner wall surface of the well and defining a step that continuously connects the inner wall surface of the lower barrel portion and the inner wall surface of the upper barrel portion.

Hence, when a fluid is injected into the well, the user can visually recognize that a required amount of fluid has been injected into the well, and the user is prevented from being exposed to a biohazard attributable to a fluid overflowing from the well.

In the cartridge of the present invention,
the step includes a planar portion having a predetermined width and being formed along the inner wall surface of the well.

Hence, when a fluid is injected into the well, the user can visually recognize that a required amount of fluid has been injected into the well because the area of the fluid surface abruptly extends at the planar portion, which serves as a marked line.

In the cartridge of the present invention,
the well's bottom end is a bottom face, and
the planar portion is formed to be flat and all parts of the planar portion are formed at a certain height from the bottom face.

In the cartridge of the present invention,
an angle formed by a plumb line to the bottom face and a line perpendicular to the planar portion is in a range of 0° to 20°.

Hence, the area of the fluid surface is allowed to abruptly extend when the level of the fluid surface reaches the planar portion.

In the cartridge of the present invention,
the step includes a rising wall surface that connects an outer perimeter of the planar portion and an inner perimeter of a bottom end of the upper space.

In the cartridge of the present invention,
an angle formed by the plumb line to the bottom face and a line perpendicular to the rising wall surface is in a range of 70° to 90°.

In the cartridge of the present invention,
the planar portion is colored or roughened.

Hence, the position of the planar portion serving as a marked line can be made distinct.

In the cartridge of the present invention,
the rising wall surface is colored or roughened.

In the cartridge of the present invention,
the plumb line to the opening that is formed on the top end of the upper space is decentered with respect to the plumb line to the bottom face.

Hence, the user can bring the tip of a syringe, a micropipettor, or any other injection tool closer to the inner wall surface side to inject a fluid while seeing the bottom face.

In the cartridge of the present invention,
an inclination angle formed by the inner wall surface of the upper space and the plumb line to the opening is an inclination angle between 0.5° and 70°.

Hence, a gradient needed for injection-molding the well can be obtained. In addition, the obtained gradient does not prevent a fluid from flowing to the bottom face.

In the cartridge of the present invention,
surface roughness of at least one of the planar portion and the rising wall surface is between Ra 0.05 μm and Ra 5 μm.

Hence, surface roughness can be obtained to the extent that the position of a marked line is clearly visible, as well as to the extent that a fluid is not prevented from flowing to the bottom face.

In the cartridge of the present invention,
a planar shape of the well seen from above the opening is any one of circular, oval, and substantially oval with both ends of a rectangular having arc-shaped ends.

In the cartridge of the present invention,
the fluid is a sample or a reagent.

A cartridge according to an embodiment will now be described with reference to the drawings, by showing an example cartridge for use in measuring a component to be measured contained in a sample when an experiment is conducted based on the principles of SPR. SPFS, or the like. FIG. 1 is a plan view illustrating a surface of the cartridge according to the embodiment, while FIG. 2 is a cross-sectional view of the cartridge according to the embodiment taken along B-B in FIG. 1.

Figure 2:
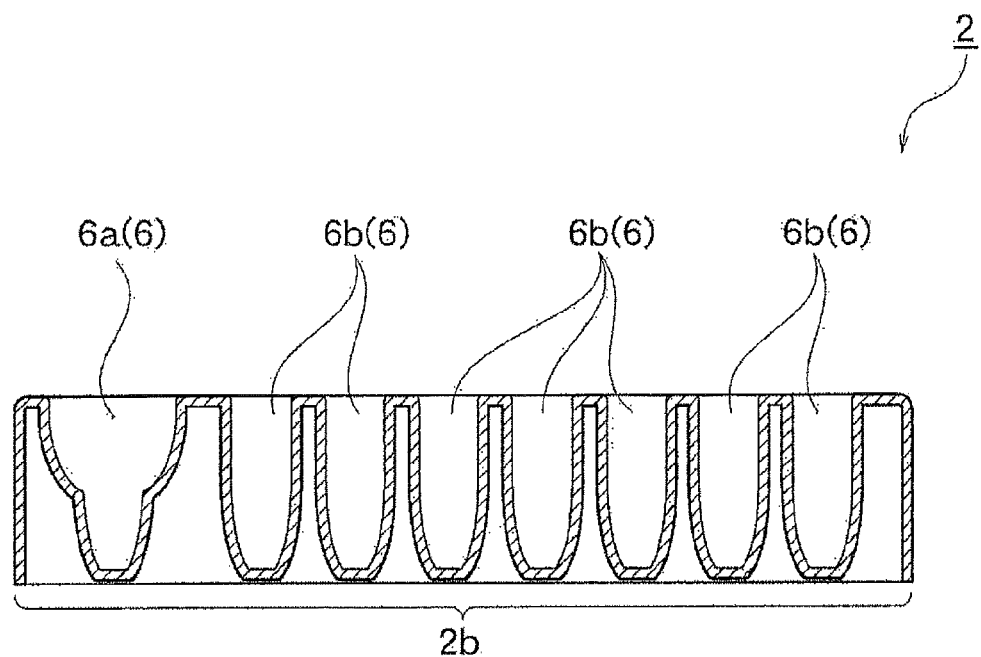
FIG. 2 is a cross-sectional view of the cartridge according to the embodiment.

As illustrated in FIGS. 1 and 2, the cartridge 2, which is formed of a resin material such as polypropylene, is a rectangular plate in plan view including a well forming portion 2b in which a plurality of recessed wells 6 are formed for storing samples to be used for an experiment.

Each of the wells 6 has its opening that is formed to elongate from a region where the wells 6 are located on the well forming portion 2b of the cartridge 2 (the left-hand region in FIG. 1) to a region where none of the wells 6 are located (the right-hand region in FIG. 1). The wells 6 include a sample well 6a into which the user directly injects a sample, and a reagent well 6b into which a reagent is injected.

Figure 3:
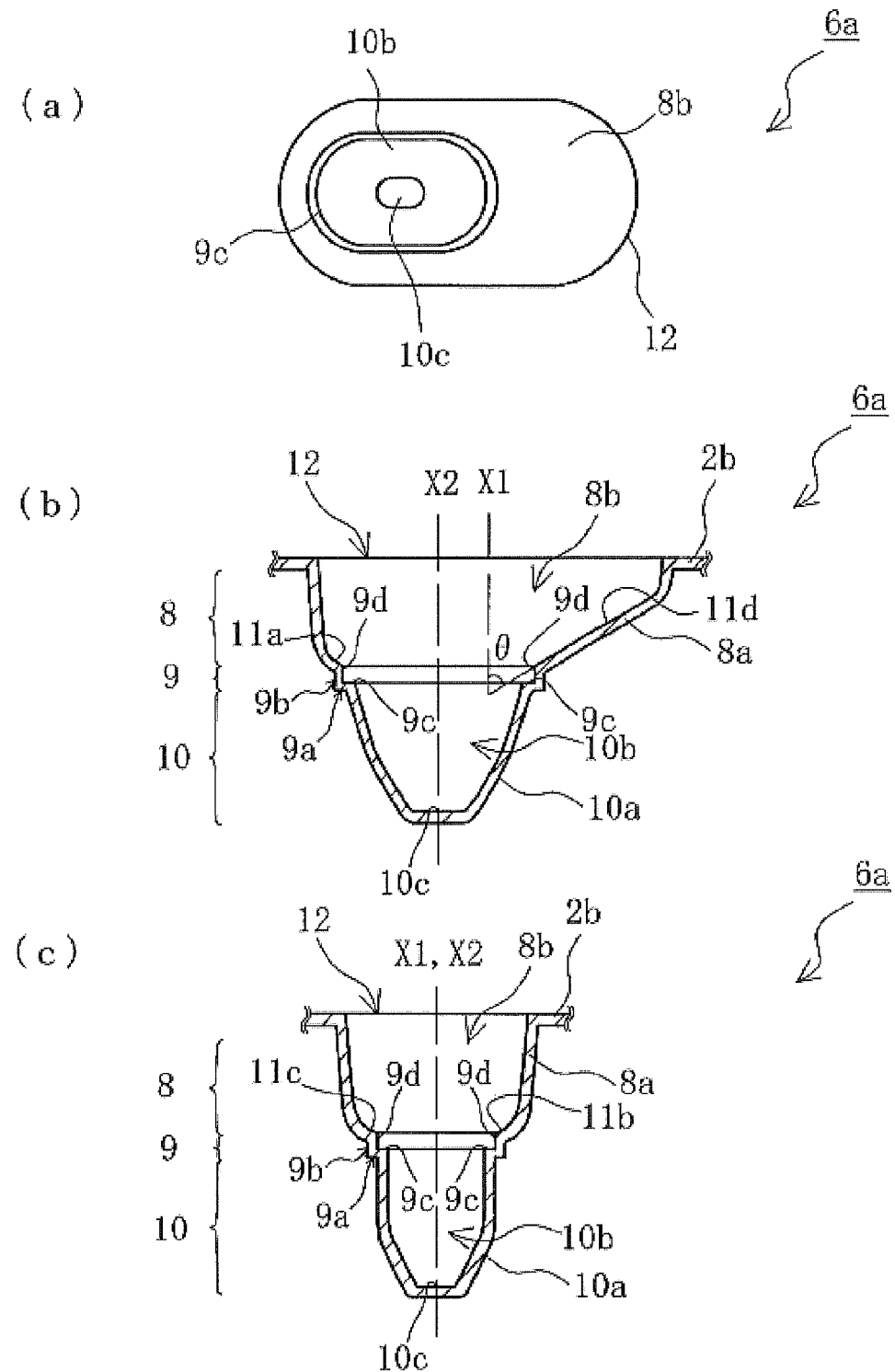
FIG. 3 illustrates a structure of a sample well according to the embodiment.

FIG. 3 illustrates a structure of the sample well 6a. FIG. 3A is a top view of the sample well 6a, while FIG. 3B is a cross-sectional view of the sample well 6a taken along A-A in FIG. 1. FIG. 3C is a cross-sectional view of the sample well 6a taken along B-B in FIG. 1.

As illustrated in FIGS. 3A to 3C, the sample well 6a includes an upper barrel portion 8 in the shape of a substantially inverted cone, a step portion 9 in the shape of a ring integrally connected to the bottom end of the upper barrel portion 8, and a lower barrel portion 10 in the shape of an inverted cone integrally connected to the step portion 9. Note that the sample well 6a is, at any height, in a substantially oval shape with arcs formed at both ends of a rectangular in cross section.

The upper barrel portion 8 includes an upper peripheral wall 8a having a predetermined thickness, with an upper space 8b formed in a region surrounded by the upper peripheral wall 8a. On top of the upper space 8b, an opening 12 is formed for supplying a sample. The upper peripheral wall 8a is inwardly inclined from the opening 12 side toward a bottom face 10c located on the lower side, and thus the upper space 8b decreases in cross-sectional area as the area is closer to the bottom face 10c.

The upper peripheral wall 8a is formed so that its inner wall surface forms an inclination angle of 0.5 to 70° with a plumb line X1 to the opening 12. Specifically, a left side wall 11a in FIG. 3B and side walls 11b and 11c in FIG. 3C each form an inclination angle to make a steep slope, while a right side wall 11d in FIG. 3B forms an inclination angle θ to make a gentle slope.

Figure 4:
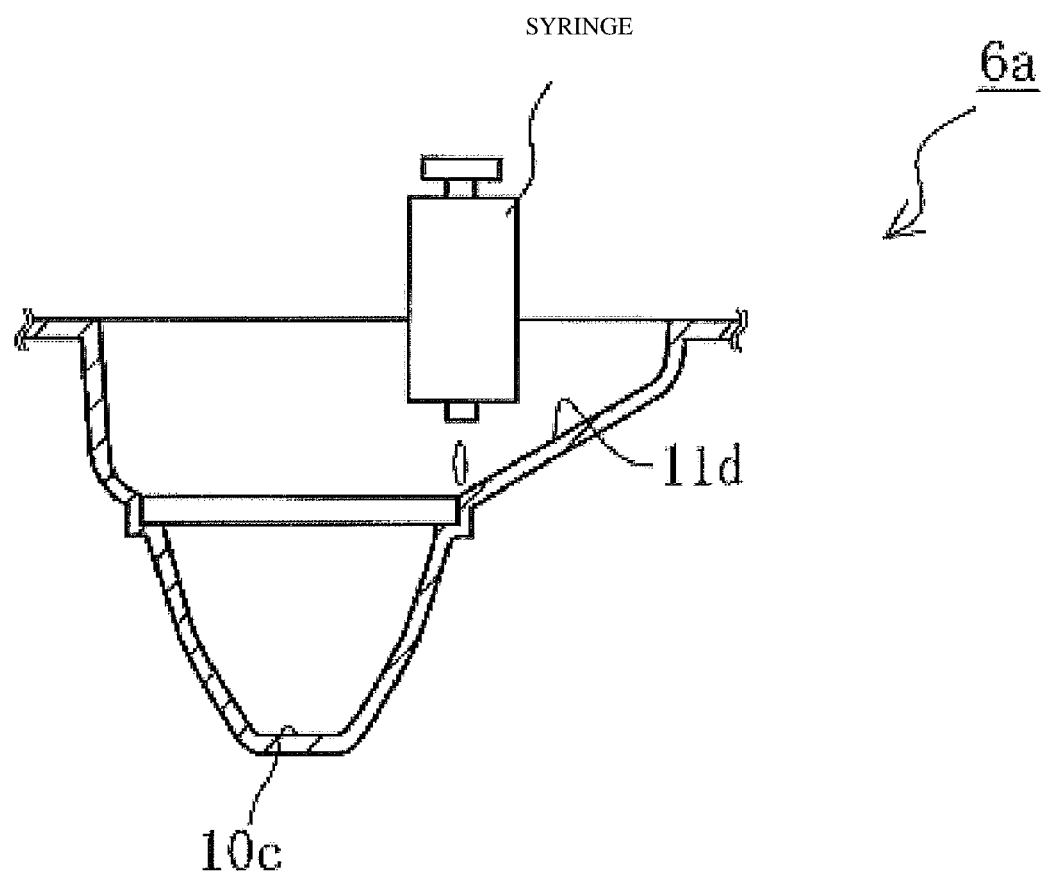
FIG. 4 illustrates the state in which a sample in a syringe is injected into the sample well according to the embodiment.

Thus, the plumb line X1 to the opening 12 is shifted from the plumb line X2 to the bottom face 10c (the plumb line X2 is parallel to the plumb line X1), and accordingly the sample well 6a is structured to be vertically eccentric. In this way, the sample well 6a is structured to be vertically eccentric in order to allow the user to bring the tip of the syringe closer to the right side wall 11d to inject a sample while seeing the bottom face 10c, as illustrated in FIG. 4. Note that the amount of eccentricity is preferably 1 mm or more because the tip of a syringe is usually φ1 mm in diameter.

An inclination angle of 0.5° or more is preferable because of easier removal from the mold during injection molding, which makes the production easier. An inclination angle of 70° or less is preferable because a sample injected into the sample well 6a can flow to the bottom face 10c to reduce any sample adhering to the well, which makes it possible to take a predetermined amount of sample for detection. The aforementioned range was confirmed by the present inventors through experiments.

The step portion 9 is L-shaped in cross section. The L shape includes a floor portion 9a on one part of the L shape and a rising wall portion 9b on the other part of the L shape, the rising wall portion 9b rising from the floor portion 9a toward the opening 12 side. On the inner wall side of the floor portion 9a, a planar portion 9c having a predetermined width is formed. On the inner wall side of the rising wall portion 9b, a rising wall surface 9d having a predetermined height is formed. In this way, a step made of the planar portion 9c and the rising wall portion 9b is formed between the upper space 8b and a lower space 10b (described later). As a result, the cross-sectional area on the top end of the lower space 10b is smaller than the cross-sectional area on the bottom end of the upper space 8b.

The planar portion 9c is formed in the shape of a ring along the inner wall surface of the sample well 6a, and is continuously connected to the top end of the inner wall surface of a lower peripheral wall 10a, which is described later. The planar portion 9c is formed to be flat without being distorted up and down. That is, every part of the planar portion 9c is formed to be at a predetermined height from the bottom face 10c.

Concerning the inclination angle of the planar portion 9c, the planar portion 9c is formed so that the angle formed by the plumb line X2 and a line (not illustrated) perpendicular to the planar portion 9c is between 0° and 20°. Nevertheless, it is preferable that the planar portion 9c is not inclined as illustrated in FIGS. 3B and 3C, and thus the angle formed by the plumb line X2 and a line perpendicular to the planar portion 9c is desirably 0°. The width of the planar portion 9c is preferably between 0.4 mm and 0.7 mm. The planar portion 9c having a width of 0.4 mm or more as above is preferable because a situation, such as failure in forming the planar portion 9c caused by chamfering performed during mold production, can be prevented, and thus the planar portion 9c can be easily formed into an accurate shape. The planar portion 9c having a width of 0.7 mm or less is preferable because the amount of a sample adhering to the planar portion 9c can be reduced. More preferably, the planar portion 9c has a width of about 0.5 mm.

The rising wall surface 9d is formed along the inner wall surface of the sample well 6a so as to continuously join the outer perimeter of the planar portion 9c and the inner wall surface of the bottom end of the upper space 8b. Concerning the inclination angle of the rising wall surface 9d, the rising wall surface 9d is formed so that the angle formed by the plumb line X2 and a line (not illustrated) perpendicular to the rising wall surface 9d is between 70° and 90°. Nevertheless, it is preferable that the rising wall surface 9d is not inclined, and thus the angle formed by the plumb line X2 and a line perpendicular to the rising wall surface 9d is desirably 90°. The height of the rising wall surface 9d is preferably between 0.3 mm and 1.0 mm. The rising wall surface 9d having a height of 0.3 mm or more as above is preferable because the rising wall surface 9d can be easily formed into an accurate shape. The rising wall surface 9d having a height of 1.0 mm or less is preferable because the amount of a sample adhering to a corner between the rising wall surface 9d and the planar portion 9c can be reduced.

The lower barrel portion 10 includes a lower peripheral wall 10a having a predetermined thickness, with the lower space 10b formed in a region surrounded by the lower peripheral wall 10a. The bottom end of the lower space 10b is closed with the bottom face 10c. The lower peripheral wall 10a is also inwardly inclined from the opening 12 side toward the bottom face 10c located on the lower side, and thus the lower space 10b decreases in cross-sectional area as the area is closer to the bottom face 10c side.

Referring to the drawings, the following describes how a sample is injected into the sample well 6a. First, the cartridge 2 is prepared with the sample well 6a being empty as illustrated in FIGS. 3A to 3C. Next, as illustrated in FIG. 4, the user prepares a syringe and injects a sample out of the syringe into the sample well 6a.

Figure 5:
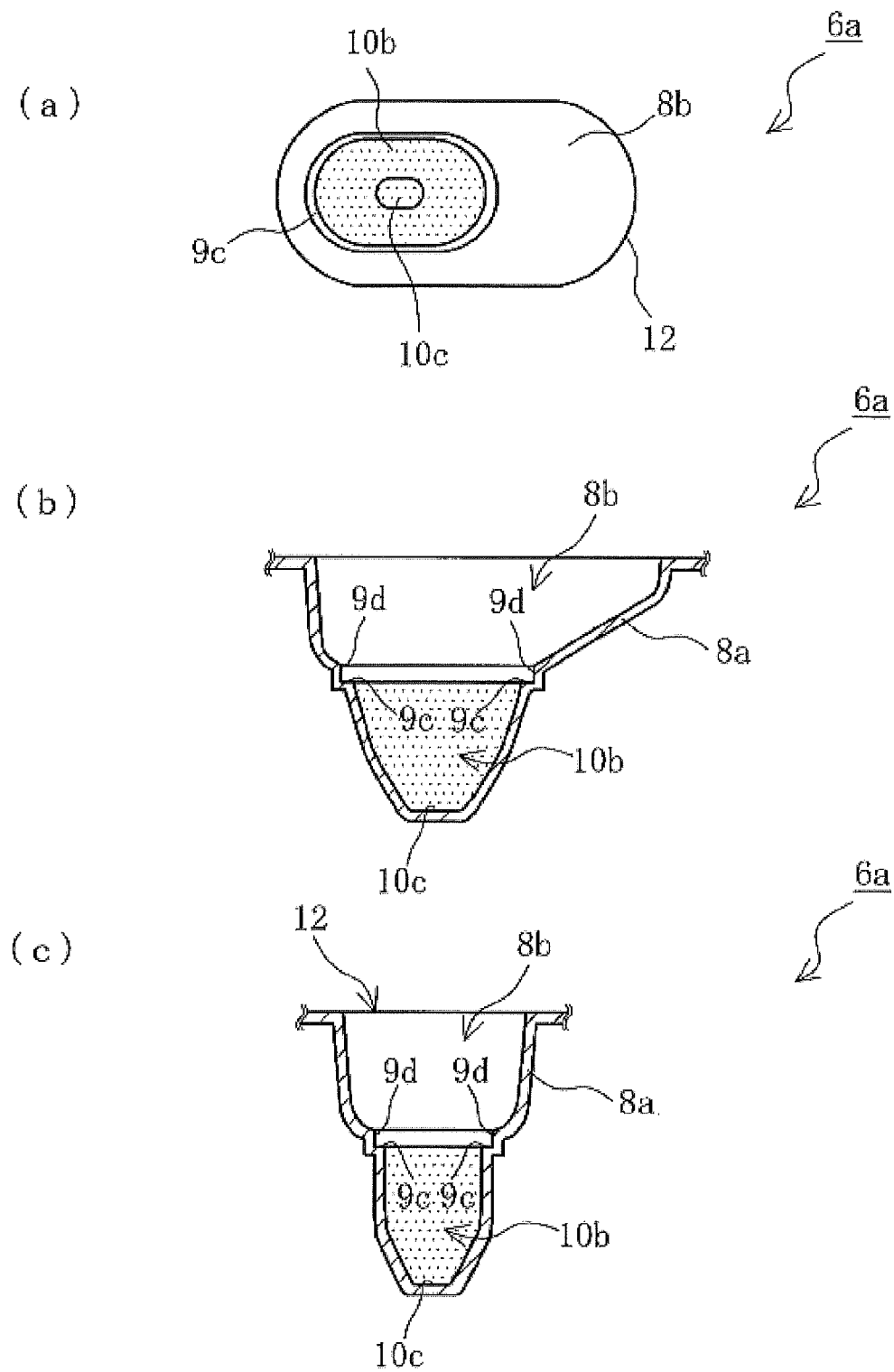
FIG. 5 illustrates the state in which a sample is injected until the fluid surface reaches the height of a planar portion of the sample well according to the embodiment.

As injected into the sample well 6a, the sample becomes retained in the lower space 10b while the fluid surface gradually increases in area and gradually decreases in rising speed. FIGS. 5A to 5C illustrate the state in which the sample has been injected into the sample well 6a to the extent that the fluid surface reaches the height of the planar portion 9c.

Figure 6:
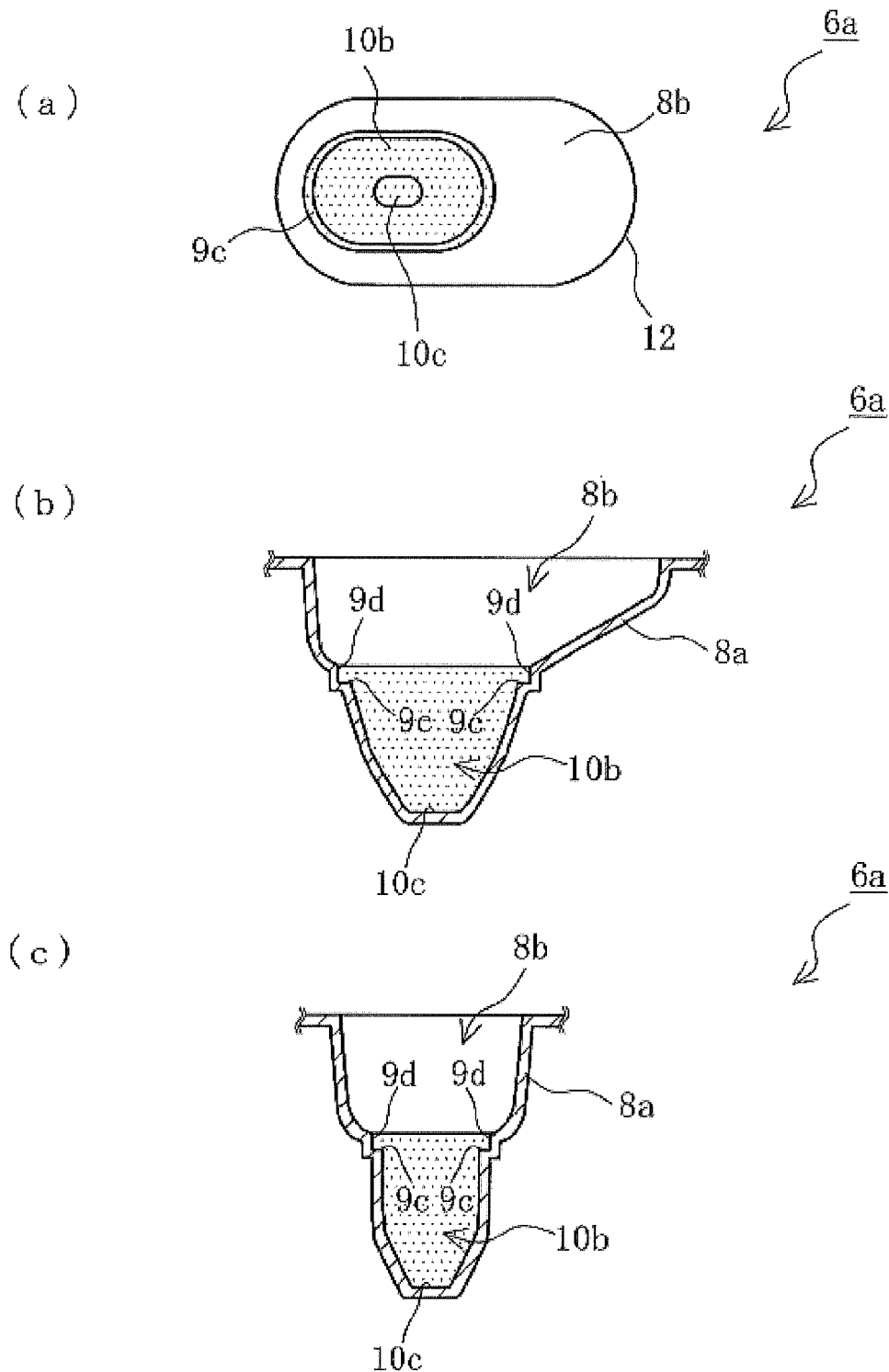
FIG. 6 illustrates the state in which a sample is injected until the fluid surface exceeds the height of the planar portion of the sample well according to the embodiment.

When the fluid surface exceeds the height of the planar portion 9c as illustrated in FIGS. 6A to 6C, the sample enters the step space formed on the planar portion 9c and the area of the fluid surface suddenly extends. This enables the user to visually recognize that a required amount of sample has been injected into the sample well 6a. In other words, the planar portion 9c functions as a marked line for letting the user know that a required amount of sample has been injected into the sample well 6a.

If the rising wall surface 9d is not inclined, further injection of the sample makes the fluid surface keep rising without changing the area of the fluid surface for a while. Thus, the fluid surface keeps on rising without changing its area for a while after the fluid level of the sample reaches the planar portion 9c. As a result, the user can be definitely aware that a required amount of sample has been injected into the sample well 6a even when the user cannot see a momentary change in the area of the fluid surface.

When the fluid level exceeds the top end of the rising wall surface 9d, the fluid surface area of the sample again extends. As described above, if the rising wall surface 9d has a predetermined height without being inclined, the top end of the rising wall surface 9d functions as a marked line indicating a permissible upper limit for injecting a sample. Accordingly, the user can confirm twice that a required amount of sample has been injected into the sample well 6a.

The cartridge 2 according to the present embodiment includes the step portion 9 disposed between the upper barrel portion 8 and the lower barrel portion 10 of the sample well 6a, with the planar portion 9c having a predetermined width and formed on the step portion 9. Thus, the planar portion 9c and the top end of the rising wall surface 9d serve as marked lines when a sample is injected into the sample well 6a, enabling the user to visually identify whether a required amount of sample has been injected into the sample well 6a. Consequently, a sample is prevented from overflowing from the sample well 6a and exposing the user to a biohazard.

The step portion 9, which is L-shaped in cross section, has a simple structure in which the planar portion 9c and the rising wall surface 9d are formed on the inner wall surface side of the sample well 6a. Thus, when the sample well 6a is formed through injection molding, there is no need to make an undercut as in the case where a protruding scale mark is formed on the inner wall surface. Therefore, the cartridge 2 in which the sample well 6a is formed can be produced easily.

In addition, the sample well 6a includes the planar portion 9c and the rising wall surface 9d, both of which are simple in structure, and thus a sample is less likely to adhere to, and stay on, a scale mark, like the case where a protruding scale mark is formed on the inner wall surface. Therefore, a sample in an amount required for measurement can be successfully taken. Likewise, if the planar shape of the sample well 6a with respect to the height direction is made substantially oval, a sample is less likely to stay on the sample well than a rectangular planar shape of the sample well 6a with respect to the height direction.

Figure 7:
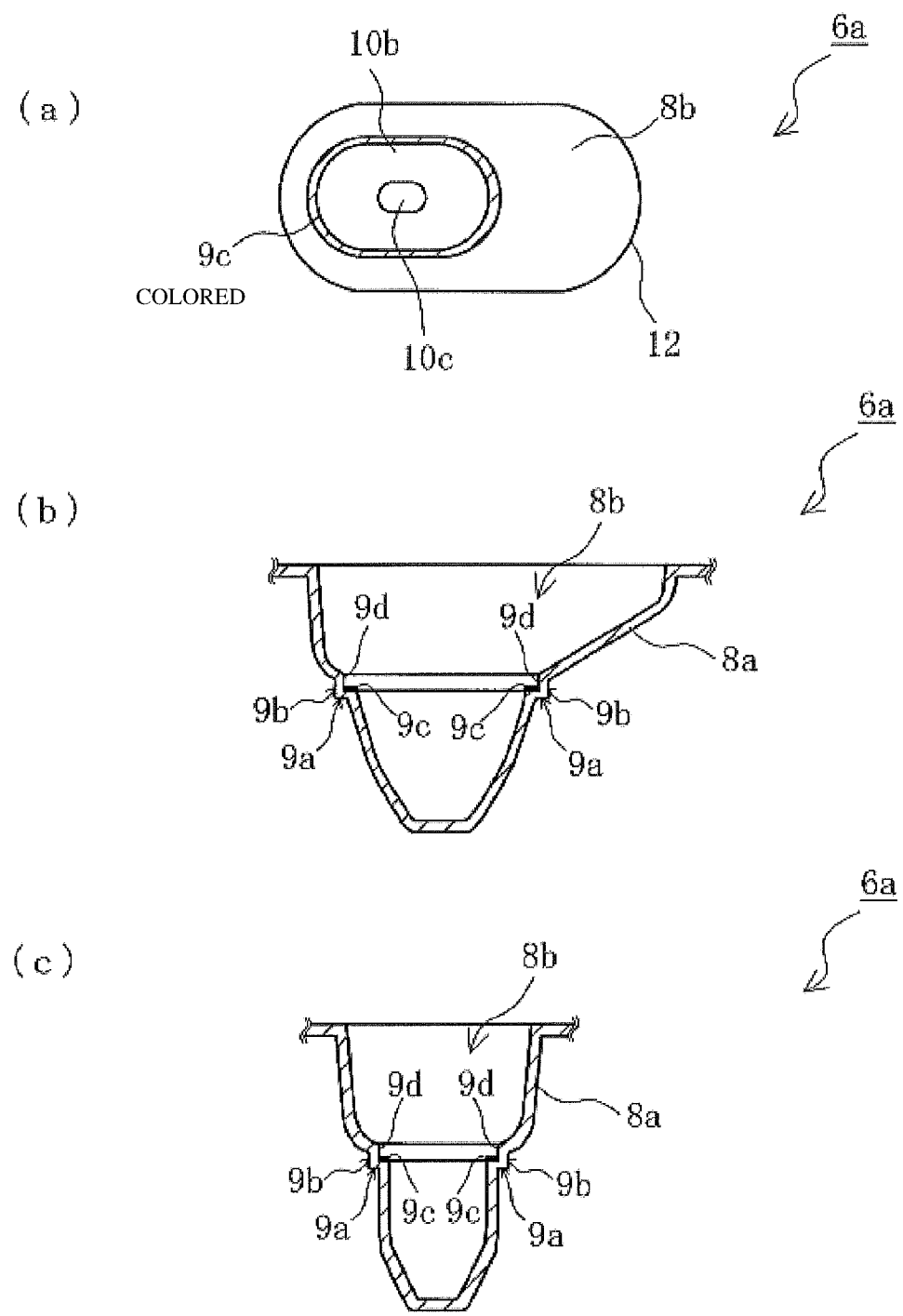
FIG. 7 illustrates a variation in which the planar portion of the sample well according to the embodiment is colored.

Note that the planar portion 9c in the foregoing embodiment may be colored with, for example, an oil-based black ink as shown in FIG. 7. This ensures that the user visually recognizes the marked line for injecting a required amount of sample. Either or both of the rising wall surface 9d and the planar portion 9c may be colored. Alternatively, to strictly prohibit an ink or any other paint from mixing with a sample, the coloring may be given to the outer wall side of the floor portion 9a of the step portion 9 and to the outer wall side of the rising wall portion 9b.

Figure 8:
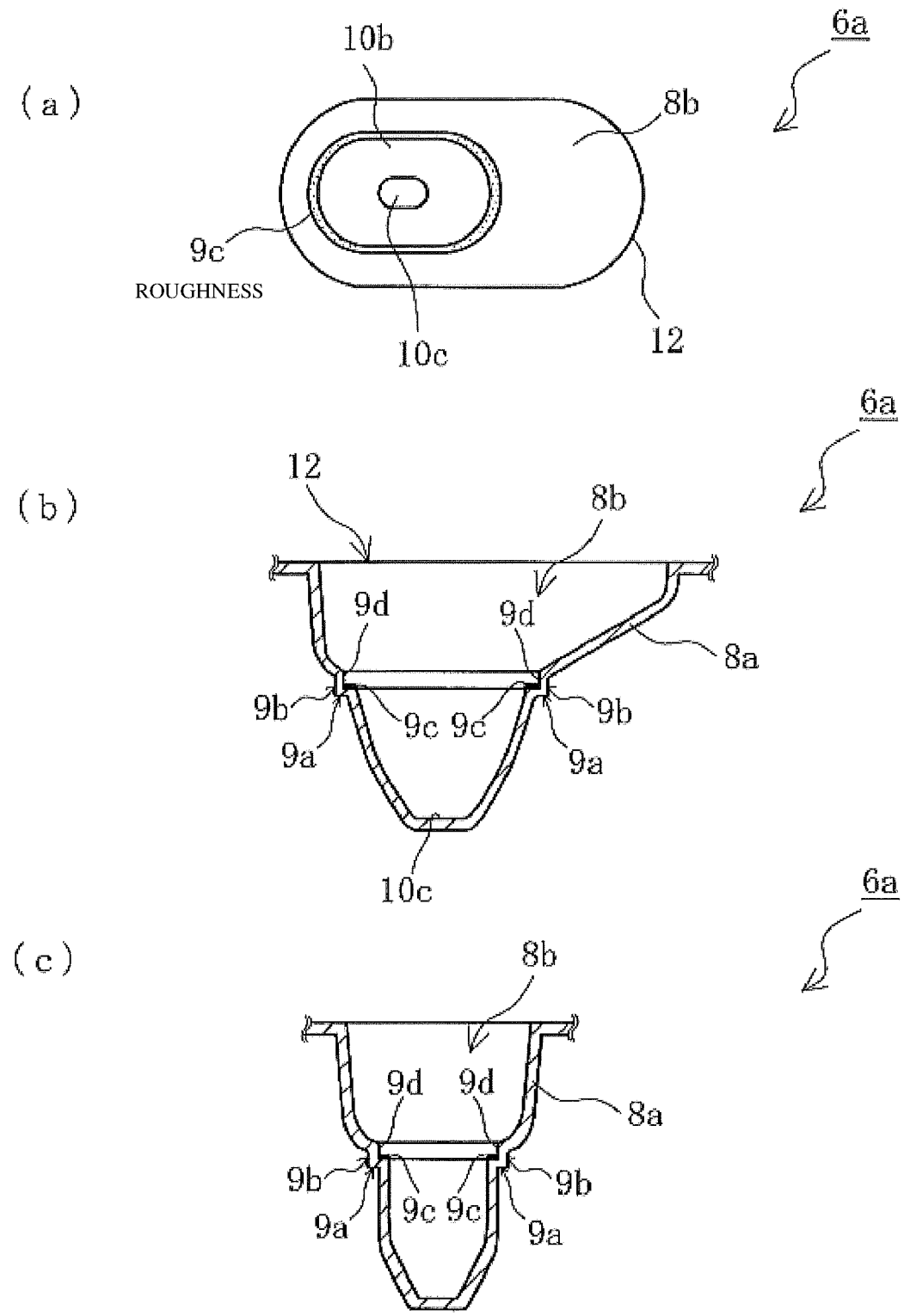
FIG. 8 illustrates a variation in which the planar portion of the sample well according to the embodiment is roughened.

As illustrated in FIG. 8, a roughening process may be performed on the planar portion 9c. Since resin materials such as polystyrene are usually milky-white transparent, the planar portion 9c becomes white-fogged when roughened, exerting an effect similar to being colored. The roughening process may be performed on either or both of the planar portion 9c and the rising wall surface 9d. Alternatively, to strictly prohibit the roughness from taking a sample to reduce the amount of sample drawn from the sample well 6a, the roughening process may be performed on the outer wall side of the floor portion 9a of the step portion 9 and on the outer wall side of the rising wall portion 9b. If the roughening process is performed, the planar portion 9c, the rising wall surface 9d, the outer wall surface of the floor portion 9a, and/or the outer wall surface of the rising wall portion 9b preferably has surface roughness between Ra 0.05 μm and Ra 5 μm. A surface roughness of Ra 0.05 μm or more is preferable because a change in color caused by the surface roughness can further improve the visibility. A surface roughness of Ra 5 μm or less is preferable because a sample injected into the sample well 6a can flow to the bottom face 10c to reduce any sample adhering to the well, which makes it possible to take a predetermined amount of sample for detection. The aforementioned range was confirmed by the present inventors through experiments.

Figure 9:
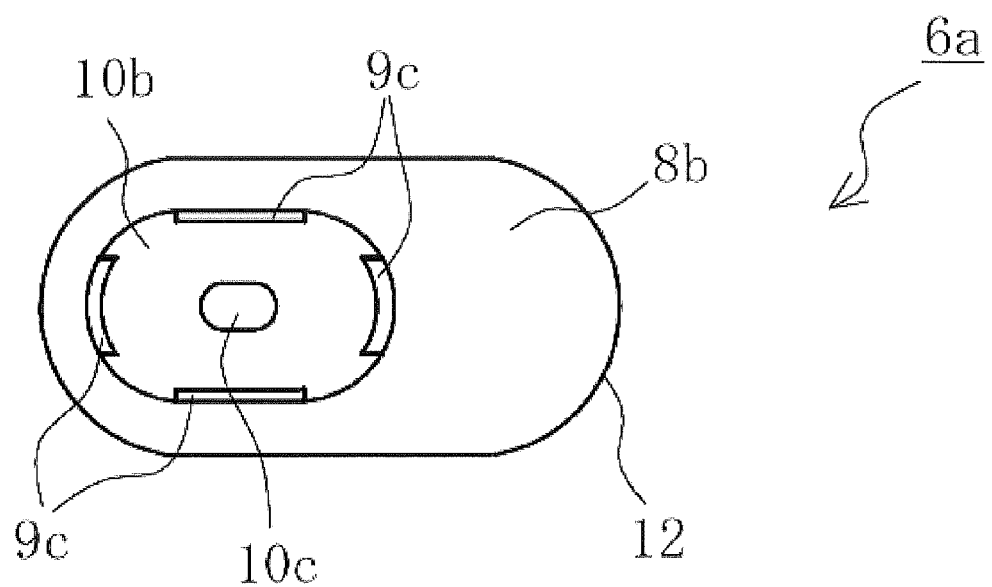
FIG. 9 illustrates a variation in which the planar portion is formed on part of the inner perimeter of the inner wall surface of the sample well according to the embodiment.

In the example described in the foregoing embodiment, the step portion 9 is formed on the whole perimeter of the sample well 6a. However, the step portion 9 may be formed on part of the perimeter. In this case, the user can still visually recognize that a required amount of sample has been injected into the sample well 6a because the area of the fluid surface of an injected sample abruptly extends at the step portion 9. In the case where the planar portion 9c is formed on part of the whole perimeter, the planar portion 9c is preferably disposed on at least four locations so that the user can be aware that the sample well 6a is not inclined. For example, the planar portion 9c is preferably disposed on each of the four locations on the inner wall surface of the sample well 6a, as illustrated in FIG. 9.

Figure 10:
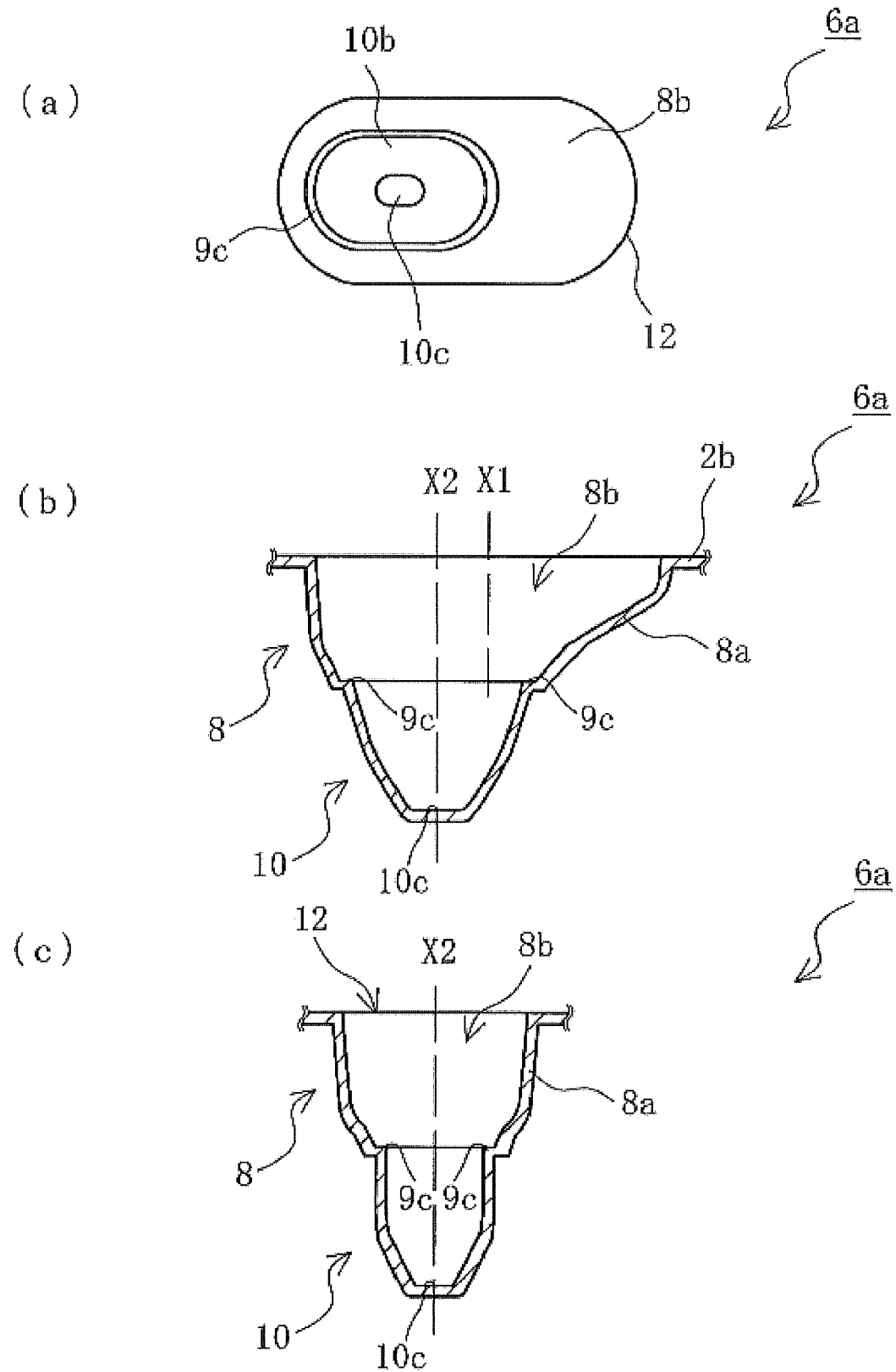
FIG. 10 illustrates a variation in which no rising wall surface is present in a step portion of the sample well according to the embodiment.

In the foregoing embodiment, the rising wall surface 9d may not necessarily be present. As illustrated in FIG. 10, the inner wall surface of the upper peripheral wall 8a may be directly coupled to the outer perimeter of the planar portion 9c. In this case, the sample well 6a is simpler in structure, making it easier to form the sample well 6a.

In the foregoing embodiment, possible methods for producing the cartridge 2 include cutting, cast molding, and injection molding involving a mold. However, in view of ease of production and precision of a finished cartridge 2, it is preferable to use injection molding to produce the cartridge 2.

In the foregoing embodiment, possible materials of members forming the cartridge 2 include chemical-resistant glass, metal, and resins being less likely to cause chemical reactions with a reagent or a sample. However, in view of ease of production, it is preferable to use resins.

Such resin materials may include noncrystalline resins such as polycarbonate (PC), acrylic resin (PMMA), and polystyrene (PS) as well as crystalline resins such as polyethylene (PE) and polypropylene (PP). However, in view of chemical resistance, it is preferable to use a crystalline resin to produce the cartridge 2. In addition, from the view point of further reducing cost, it is preferable to use polypropylene (PP) to produce the cartridge 2.

No particular limitation is imposed on the color of the resin material. However, since the sample may often be blood, it is preferable to use a resin material in translucent milky white so that splattering or the like of blood can be easily recognized.

In the foregoing embodiment, a required amount of reagent is injected into, and stored in, the reagent well 6b in advance after the cartridge 2 is molded. The top face of the reagent well 6b is preferably sealed with a seal or the like after a reagent is injected. This prevents the reagent from spilling from the reagent well 6b when the user carries the cartridge 2, and thus the cartridge 2 is easier to handle. Sealing the top face of the reagent well 6b also allows the reagent to be stored without contamination or mixture with foreign substances. No particular limitation is imposed on materials of the seal or sealing methods. Each individual reagent well 6b may be formed in accordance with the intended use.

In the example described in the foregoing embodiment, the step portion 9 is disposed on the sample well 6a into which the user injects a sample. However, the step portion 9 may also be disposed on the reagent well 6b. For example, in the case where the top face of the reagent well 6b is not sealed and the user is to inject a reagent into the reagent well 6b, if the step portion 9 is disposed on the reagent well 6b, the planar portion 9c serves as a marked line, and thus the user can visually recognize that a required amount of reagent has been injected into the reagent well 6b.

In the example described in the foregoing embodiment, the plumb line X1 to the opening 12 in the sample well 6a is shifted to the right in FIG. 3 and decentered with respect to the plumb line X2 to the bottom face 10c. However, the direction of decentering is not limited to this. For example, with reference to FIG. 3, the plumb line X1 may be decentered to the left with respect to the plumb line X2.

In the foregoing embodiment, the planar shape of the well 6 seen from above the opening 12 may be circular or oval.

The foregoing embodiment presents an example in which the cartridge 2 is rectangular in plan view so that the user can easily hold the cartridge 2 in his/her hand. However, the cartridge 2 may not necessarily be rectangular in plan view.

EXAMPLES

Examples of experiments conducted on the cartridge 2 according to the embodiments will now be described. To begin the experiments, the user prepared seven cartridges 2 including different sample wells 6a in shape (cartridges 2 including shape 1 to 7 sample wells, which are described later). Each of the cartridges 2 used for the experiments is a translucent milky-white cartridge made from polypropylene, 60 mm long, 30 mm wide, and 17 mm high, with all the parts including the sample well 6a having a thickness of 1 mm. In each of the cartridges 2, a required amount of reagent was injected into the reagent wells 6b, and then every reagent well 6b was sealed on its top face by bonding a 0.02 mm thick aluminum seal onto the surface of the well forming portion 2b through thermocompression bonding.

Next, the user placed the individual cartridges 2 on a table, and then injected a test fluid into the sample well 6a in each cartridge 2, where the test fluid was a solution being colored in red and having a viscosity equal to that of a blood sample. A needleless syringe having an inner diameter of φ10 mm and a capacity of 10 cc (see FIG. 4) was used for injecting the sample.

Experiment results were expressed by three grades (○, △, x) given to the individual sample wells in different shapes by giving comprehensive consideration to failure or success in injecting a sample up to the marked line, visibility of the marked line, ease of recognizing how much sample has been injected, and the like (see FIG. 13). The symbol ○ represents that everything was "good", △ represents that "some aspects were good", and x represents that "the sample was not injected in accordance with the marked line".

Example 1

Example 1 represents an experiment conducted on the cartridge 2, which is one of the aforementioned seven cartridges 2 and includes the sample well 6a in the shape presented in FIG. 3 (hereinafter called the shape 1 sample well). In the shape 1 sample well, the depth from the opening 12 to the bottom face 10c (hereinafter simply called the depth) was 14 mm, the longest length of the opening 12 (hereinafter simply called the opening length) was 19.5 mm, the width of the opening 12 (hereinafter simply called the opening width) was 10 mm, the distance between the plumb line X1 and the plumb line X2 (hereinafter simply called the decentering distance) was 3 mm, the width of the planar portion 9c (hereinafter simply called the planar width) was 0.5 mm, and the height of the rising wall surface 9d (hereinafter simply called the rising height) was 0.7 mm. Concerning inclination angles of the inner wall surface of the upper peripheral wall 8a illustrated in FIG. 3B, the inclination angle (not illustrated) formed by the inner wall surface of the left side wall 11a and the plumb line X1 was 5°, while the inclination angle θ formed by the inner wall surface of the right side wall 11d and the plumb line X1 was 60°.

The experiment conducted on the shape 1 sample well demonstrated that the sample could be accurately injected up to the marked line, that is the height of the planar portion 9c, because it was easy to identify a change in speed of the fluid surface of the sample being injected, and it was also easy to visually recognize the planar portion 9c. In addition, since the upper end of the rising wall surface 9d served as a marked line indicating a permissible upper limit of the sample, which means any excessive amount of injected sample was to be indicated by a sudden extension of the fluid surface, the sample could be confidently injected. Therefore, the shape 1 sample well was evaluated as "○" as shown in the table in FIG. 13.

Example 2

Example 2 represents an experiment conducted on the cartridge 2 including the sample well 6a in which the planar portion 9c on the shape 1 well was colored (hereinafter called the shape 2 sample well), as illustrated in FIG. 7. The shape 2 sample well was the same as the shape 1 sample well in size of the well and inclination angle of the inner wall surface of the upper peripheral wall 8a.

The experiment conducted on the shape 2 sample well demonstrated that a required amount of sample could be easily injected because of higher visibility of the planar portion 9c than that of the shape 1 sample well owing to the change in color of the planar portion 9c. Therefore, the shape 2 sample well was evaluated as "○" as shown in the table in FIG. 13.

Example 3

Example 3 represents an experiment conducted on the cartridge 2 including the sample well 6a in which the planar portion 9c on the shape 1 well was roughened (hereinafter called the shape 3 sample well), as illustrated in FIG. 8. The shape 3 sample well was the same as the shape 1 sample well in size of the well and inclination angle of the inner wall surface of the upper peripheral wall 8a.

The experiment conducted on the shape 3 sample well demonstrated that, as in Example 2, a required amount of sample could be easily injected because of higher visibility of the planar portion 9c than that of the shape 1 sample well owing to the change in color caused by roughening of the planar portion 9c. Therefore, the shape 3 sample well was evaluated as "○" as shown in the table in FIG. 13.

Example 4

Example 4 represents an experiment conducted on the cartridge 2 including the sample well 6a that is a modification of the shape 1 well and that includes the planar portion 9c being formed on each of the four locations on the inner wall surface of the sample well 6a (hereinafter called the shape 4 sample well), as illustrated in FIG. 9. The shape 4 sample well was the same as the shape 1 sample well in size of the well and inclination angle of the inner wall surface of the upper peripheral wall 8a.

The experiment conducted on the shape 4 sample well demonstrated that the sample could be injected up to the marked line, that is the height of the planar portion 9c, because it was easy to identify a change in speed of the fluid surface of the sample being injected, and it was also easy to visually recognize the planar portion 9c. However, visibility of the planar portion 9c was lower than that of the shape 1 sample well because the planar portion 9c was not formed on every part of the perimeter of the inner wall surface of the sample well 6a, and thus the step serving as a marked line was missing in the region where the planar portion 9c was not formed. Therefore, the shape 4 sample well was evaluated as "△" as shown in the table in FIG. 13.

Example 5

Example 5 represents an experiment conducted on the cartridge 2 including the sample well 6a that is a modification of the shape 1 well and that directly couples the inner wall surface of the upper peripheral wall 8a to the outer perimeter of the planar portion 9c (hereinafter called the shape 5 sample well), as illustrated in FIG. 10. The shape 5 sample well was the same as the shape 1 sample well in size except that the rising height was absent. Concerning inclination angles of the inner wall surface of the upper peripheral wall 8a illustrated in FIG. 10, the inclination angle (not illustrated) formed by the inner wall surface of the left side wall 11a and the central axis X1 was 140, while the inclination angle (not illustrated) formed by the inner wall surface of the right side wall 11d and the central axis X1 was 55°.

As in Example 4, the experiment conducted on the shape 5 sample well demonstrated that the sample could be injected up to the marked line, that is the height of the planar portion 9c, because it was easy to identify a change in speed of the fluid surface of the sample being injected, and it was also easy to visually recognize the planar portion 9c. However, visibility of the planar portion 9c was lower than that of the shape 1 sample well because of the absence of the rising wall surface 9d. In addition, because of the absence of the rising wall surface 9d, a marked line indicating a permissible upper limit of the sample was lost. Therefore, the shape 5 sample well was evaluated as "△" as shown in the table in FIG. 13.

Example 6

Figure 11:
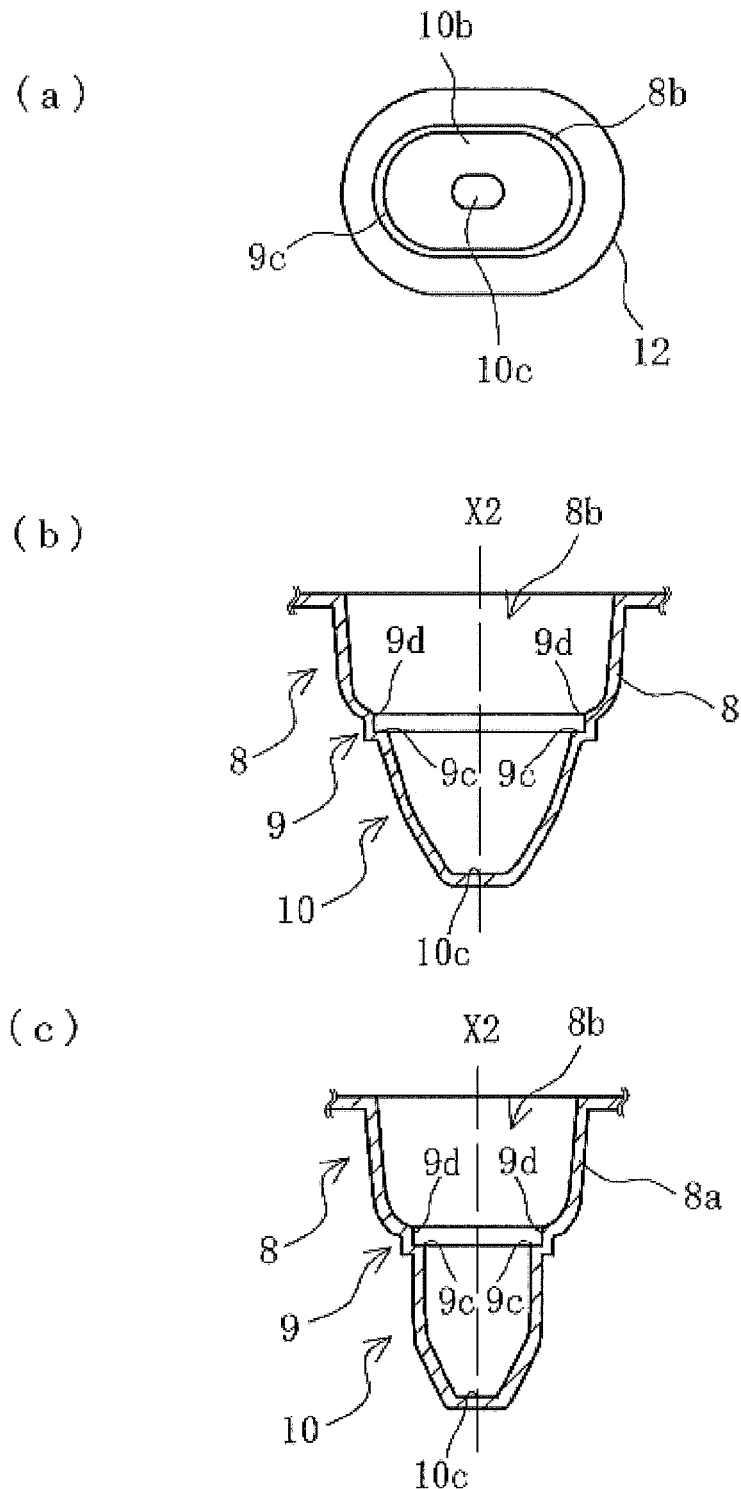
FIG. 11 illustrates a sample well according to another embodiment.

Example 6 represents an experiment conducted on the cartridge 2 including the sample well that is a modification of the shape 1 well and that includes a single plumb line X identical to the plumb line X2 to the bottom face 10c, as illustrated in FIG. 11, to remove eccentricity in the upper barrel portion 8 (hereinafter called the shape 6 sample well). The shape 6 sample well was the same as the shape 1 sample well in size except that the shape 6 sample well had a shorter opening length, 13.8 mm, because of no decentering distance. Concerning inclination angles of the inner wall surface of the upper peripheral wall 8a illustrated in FIG. 11, both the inclination angle (not illustrated) formed by the inner wall surface of the left side wall 11a and the plumb line X2 and the inclination angle (not illustrated) formed by the inner wall surface of the right side wall 11d and the plumb line X2 were 10°.

The experiment conducted on the shape 6 sample well demonstrated that, owing to the presence of the planar portion 9c, the sample could be accurately injected up to the marked line, that is the height of the planar portion 9c, because it was easy to identify a change in speed of the fluid surface of the sample being injected. However, since the upper barrel portion 8 in the shape 6 sample well was not eccentric, the insertion point of the syringe was hidden by the user's hand and the syringe body, and the user sometimes lost sight of the planar portion 9c and the rising wall surface 9d serving as marked lines. Therefore, the shape 6 sample well was evaluated as "△" as shown in the table in FIG. 13.

Comparative Example 1

Figure 12:
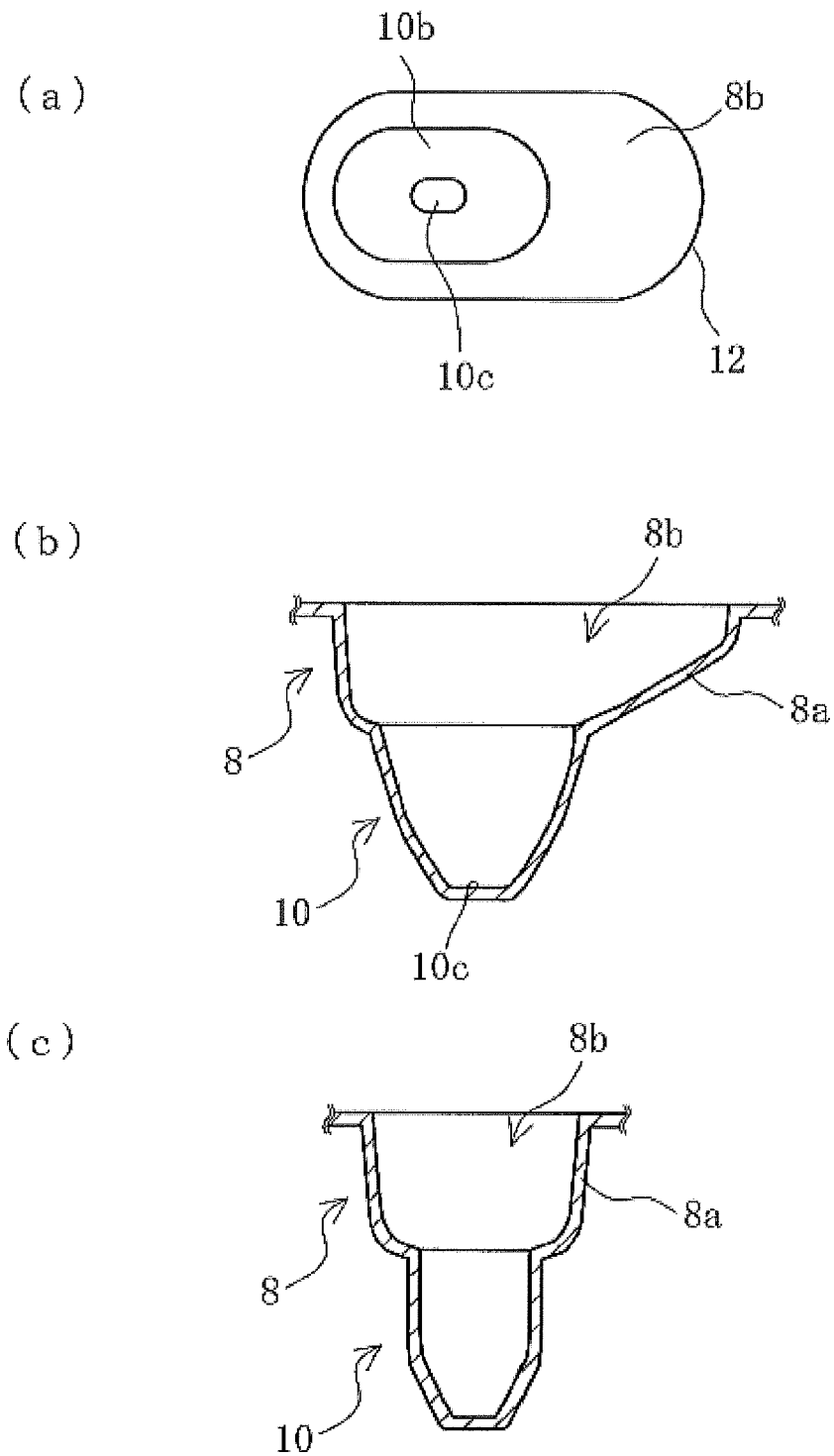
FIG. 12 illustrates a sample well according to another embodiment.

Comparative Example 1 represents an experiment conducted on the cartridge 2 including the sample well that is a modification of the shape 1 well to eliminate the step portion 9, as illustrated in FIG. 12 (hereinafter called the shape 7 sample well). The shape 7 sample well was the same as the shape 1 sample well in size of the well and inclination angle of the inner wall surface of the upper peripheral wall 8a, except for the absence of the planar width and the rising height.

The experiment demonstrated that the marked line on the shape 7 sample well was too dim and unclear to visually recognize. Thus, it was unknown whether a required amount of sample has been injected, resulting in excessive injection of the sample. Therefore, the shape 7 sample well was evaluated as "x" as shown in the table in FIG. 13.

REFERENCE SIGNS LIST

2 Cartridge
2b Well forming portion
6 Well
6a Sample well
6b Reagent well
8 Upper barrel portion
8a Upper peripheral wall
8b Upper space
9 Step portion
9a Floor portion
9b Wall portion
9c Planar portion
9d Rising wall surface
10 Lower barrel portion
10a Lower peripheral wall
10b Lower space
10c Bottom face
11a Left side wall
11b Side wall
11c Side wall
11d Right side wall

The invention claimed is:
1. A cartridge for use in measuring a component to be measured contained in a fluid, the cartridge comprising a recessed well formed for storing the fluid,
wherein the well comprises:
a lower barrel portion including a lower peripheral wall surrounding a lower space having a closed bottom that is closed by a bottom face, a volume of the lower barrel portion corresponding to a required amount of the fluid for measurement to be injected into the well;
an upper barrel portion that is formed above the lower barrel portion, the upper barrel portion including an upper peripheral wall surrounding an upper space having an opening on a top end for supplying a sample to the well, the upper space having a cross-sectional area that decreases towards the closed bottom in the lower space; and
a step portion formed between the lower barrel portion and the upper barrel portion, the step portion continuously connecting an inner wall surface of the lower peripheral wall and an inner wall surface of the upper peripheral wall, the step including a floor portion with a planar portion, which extends radially from the inner wall surface of the lower peripheral wall and has a predetermined width, and a rising wall portion with a rising wall surface that connects an outer perimeter of the planar portion and a bottom end of the inner wall surface of the upper peripheral wall, wherein an inclination angle formed at the bottom end of the upper space by the inner wall surface of the upper peripheral wall and a plumb line perpendicular to the bottom face is greater than an inclination angle formed at the bottom end of the upper space by the rising wall surface of the step and the plumb line, and wherein the rising wall surface is colored or roughened to be non-transparent to visible light.

2. The cartridge according to claim 1, wherein the planar portion is formed to be flat and all parts of the planar portion are formed at a certain height from the bottom face.

3. The cartridge according to claim 2, wherein an angle formed by the plumb line and a line perpendicular to the planar portion is in a range of 0° to 20°.

4. The cartridge according to claim 1, wherein an angle formed by the plumb line and a line perpendicular to the rising wall surface is in a range of 70° to 90°.

5. The cartridge according to claim 1, wherein the planar portion has a color or roughness that is different from a color or roughness of the lower peripheral wall and the upper peripheral wall.

6. The cartridge according to claim 1, wherein the rising wall surface has a color or roughness that is different from a color or roughness of the lower peripheral wall and the upper peripheral wall.

7. The cartridge according to claim 2, wherein the opening that is formed on the top end of the upper space is decentered with respect to the bottom face.

8. The cartridge according to claim 1, wherein an inclination angle formed by the inner wall surface of the upper space and the plumb line is an inclination angle between 0.5° and 70°.

9. The cartridge according to claim 1, wherein a surface roughness of at least one of the planar portion and the rising wall surface is between Ra 0.05 μm and Ra 5 μm.

10. The cartridge according to claim 1, wherein a planar shape of the well seen from above the opening is any one of circular, oval, and substantially oval with both ends of a rectangular having arc-shaped ends.

11. The cartridge according to claim 1, wherein the fluid is a sample or a reagent.

12. A cartridge for use in measuring a component to be measured contained in a fluid, the cartridge comprising a recessed well formed for storing the fluid,
wherein the well comprises:
a lower barrel portion including a lower peripheral wall surrounding a lower space having a closed bottom that is closed by a bottom face, a volume of the lower barrel portion corresponding to a required amount of the fluid for measurement to be injected into the well;
an upper barrel portion that is formed above the lower barrel portion, the upper barrel portion including an upper peripheral wall surrounding an upper space having an opening on a top end for supplying a sample to the well; and
a step portion formed between the lower barrel portion and the upper barrel portion, the step portion continuously connecting an inner wall surface of the lower peripheral wall and an inner wall surface of the upper peripheral wall, wherein at least a surface of the step portion has a color or roughness that is different from a color or roughness of the lower peripheral wall and the upper peripheral wall, the step including a floor portion with a planar portion, which extends radially from the inner wall surface of the lower peripheral wall and has a predetermined width, and a rising wall portion with a rising wall surface that connects an outer perimeter of the planar portion and a bottom end of the inner wall surface of the upper peripheral wall, wherein an inclination angle formed at the bottom end of the upper space by the inner wall surface of the upper peripheral wall and a plumb line perpendicular to the bottom face is greater than an inclination angle formed at the bottom end of the upper space by the rising wall surface of the step and the plumb line, and wherein the rising wall surface is colored or roughened to be non-transparent to visible light.

13. A cartridge for use in measuring a component to be measured contained in a fluid, the cartridge comprising a recessed well formed for storing the fluid,
wherein the well comprises:
a lower barrel portion including a lower peripheral wall surrounding a lower space having a closed bottom that is closed by a bottom face, a volume of the lower barrel portion corresponding to a required amount of the fluid for measurement to be injected into the well;
an upper barrel portion that is formed above the lower barrel portion, the upper barrel portion including an upper peripheral wall surrounding an upper space having an opening on a top end for supplying a sample to the well, the upper space having a cross-sectional area that decreases towards the closed bottom in the lower space, the upper peripheral wall has a first side and a second side that is disposed opposite from the first side; and
a step portion formed between the lower barrel portion and the upper barrel portion, the step portion continuously connecting an inner wall surface of the lower peripheral wall and an inner wall surface of the upper peripheral wall, wherein the step portion includes a rising wall portion with a rising wall surface that adjoins a bottom end of the inner wall surface of the upper peripheral wall, and wherein the rising wall surface is colored or roughened to be non-transparent to visible light, and
wherein the opening at the top end of the upper peripheral wall is eccentric with respect to the bottom face of the lower barrel portion, and an inclination of the inner wall surface of the upper peripheral wall on the first side is different from an inclination of the inner wall surface of the upper peripheral wall on the second side.

14. The cartridge according to claim 1, wherein the upper peripheral wall has a first side and a second side that is disposed opposite from the first side, the opening at the top end of the upper peripheral wall is eccentric with respect to the bottom face of the lower barrel portion, and an inclination of the inner wall surface of the upper peripheral wall on the first side is different from an inclination of the inner wall surface of the upper peripheral wall on the second side.

15. The cartridge according to claim 1, wherein a fluid surface area of the fluid extending over the planar portion provides a visual indication that the required amount of the fluid for measurement has been injected into the well.

16. The cartridge according to claim 1, wherein the cross-sectional area of the upper space has an oval shape with a major axis and a minor axis, the upper barrel portion has a first side and a second side on opposing sides of the major axis and a third side and a fourth side on opposing sides of the minor axis, and an inclination formed by the inner wall surface of the upper space at the first side, the third side, the fourth side is an inclination angle between 0.5° and 14°.

17. The cartridge according to claim 16, wherein an inclination angle formed by the inner wall surface of the upper space at the second side is an inclination angle between 55° and 70°.

* * * * *